(12) United States Patent
Hayes et al.

(10) Patent No.: US 7,032,318 B2
(45) Date of Patent: Apr. 25, 2006

(54) SELF-LEVELING LASER ALIGNMENT TOOL AND METHOD THEREOF WHICH COMPENSATES FOR MATERIAL STIFFNESS OF AN INCLUDED PENDULUM

(75) Inventors: Jim Hayes, Urbana, OH (US); Robin McCarty, Fairborn, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 57 days.

(21) Appl. No.: 10/894,306

(22) Filed: Jul. 19, 2004

(65) Prior Publication Data

US 2006/0010698 A1    Jan. 19, 2006

(51) Int. Cl.
*G01C 15/00* (2006.01)
*G01B 11/26* (2006.01)

(52) U.S. Cl. .......................... 33/286; 33/291
(58) Field of Classification Search .................. 33/286, 33/281, 282, 283, 285, 291, DIG. 21, 391–402
See application file for complete search history.

(56) References Cited

U.S. PATENT DOCUMENTS

| | | | |
|---|---|---|---|
| 3,771,876 A | 11/1973 | Ljungdahl et al. | |
| 4,679,937 A | 7/1987 | Cain et al. | |
| 4,700,479 A * | 10/1987 | Saito et al. | 33/366.24 |
| 4,801,791 A | 1/1989 | Cain | |
| 4,852,265 A | 8/1989 | Rando et al. | |
| 5,257,279 A | 10/1993 | Dugan et al. | |
| 5,272,814 A * | 12/1993 | Key | 33/290 |
| 5,459,932 A | 10/1995 | Rando et al. | |
| 5,541,727 A | 7/1996 | Rando et al. | |
| 5,552,886 A * | 9/1996 | Kitajima et al. | 33/291 |
| 5,619,802 A | 4/1997 | Rando et al. | |
| 5,917,587 A | 6/1999 | Rando | |
| 6,384,913 B1 | 5/2002 | Douglas et al. | |
| 6,493,952 B1 | 12/2002 | Kousek et al. | |
| 6,563,646 B1 | 5/2003 | Litvin | |
| 6,722,048 B1 * | 4/2004 | Huang et al. | 33/286 |
| 2003/0029048 A1 * | 2/2003 | Huang et al. | 33/286 |

FOREIGN PATENT DOCUMENTS

GB      835 810 A      5/1960
JP      03274410 A   * 12/1991

* cited by examiner

Primary Examiner—Christopher W. Fulton
(74) Attorney, Agent, or Firm—Dinsmore & Shohl LLP

(57) ABSTRACT

A self-leveling laser alignment tool and method thereof which provides a laser beam in a substantially truly level or plumb orientation are disclosed. Magnetic attraction is used to compensate for leveling errors of an approximately or partially leveled pendulum platform that is suspended from a flexible support member having a predetermined material stiffness. The material stiffness of the suspension member is compensated by using magnets which pulls the pendulum platform into an orientation that is substantially truly level and plumb.

32 Claims, 1 Drawing Sheet

SELF-LEVELING LASER ALIGNMENT TOOL AND METHOD THEREOF WHICH COMPENSATES FOR MATERIAL STIFFNESS OF AN INCLUDED PENDULUM

BACKGROUND OF THE INVENTION

This invention relates to self-leveling laser alignment tools, and in particular to a self-leveling laser alignment tool and method which compensates for material stiffness of the suspension element of the included pendulum suspension system of the laser alignment tool.

A variety of survey and carpentry tools have previously employed lasers to improve accuracy and reliability of leveling. To further improve the accuracy of such laser alignment tools, there are several methods to automatically self-level either the laser or a reflective surface within the laser alignment tool.

In one general category of automatic self-leveling, a pendulum suspension system is used to level the laser by gravity. In one pendulum suspension system example, the laser or reflective surface is suspended by a ball bearing pivot within a housing. However, at tilt angles close to level the force available to overcome the friction in the ball bearings is quite small, leading to inaccuracy.

In another pendulum suspension system example, the laser or reflective surface is hung by a flexible support member, such as a thread, a wire or a coil spring. Threads, however, provide little if any torsion resistance, thereby leading to line orientation difficulties. Additionally, at tilt angles, material stiffness (i.e., bending, strain, deflection) in the wire or coil spring although small, does not allow the pendulum to hang truly plumb, thereby also leading to inaccuracy.

Accordingly, there is a need for a self-leveling laser alignment tool and method which compensates for material stiffness of a pendulum support in a provided pendulum suspension system of the laser alignment tool.

SUMMARY OF THE INVENTION

The present invention provides a substantially level and plumb pendulous pendulum platform of a laser alignment tool in two stages. In a first stage, the pendulum platform with a large self-leveling range is deflected under the weight of its mass. In a second stage, final tilt correction is provided through magnetic attraction. Magnetic attraction between magnets and a pendulum platform overcomes the material stiffness of the pendulum suspension element, which would otherwise prevent the platform from achieving a truly level and plumb state.

In one embodiment, a laser source and optics are mounted on the pendulum platform of a pendulum suspension system. The pendulum platform is very close to level because of the relatively low material stiffness of the pendulum suspension element. The remaining relatively small tilt dependent errors are corrected by magnetic attraction between magnets mounted to a housing of the laser alignment tool and ferrous materials provided to the pendulum suspension system. The magnets provide a laterally regionally linear force due to a magnetic field around the ferrous materials. As the pendulum platform is tilted as a result of the housing being tilted, the distance between the ferrous materials and the magnets in the direction of the tilt decreases which in turn increases the attraction force on the ferrous materials. Accordingly, the magnetic attraction tends to compensate for the material stiffness of the pendulum suspension element pulling the platform in a position that is substantially truly plumb and level.

In another embodiment, provided is a self-leveling method which compensates for material stiffness in a pendulum suspension system of a laser alignment tool. The method comprises supporting a platform from a pendulum suspension element having a predetermined material stiffness. The platform has a large self-leveling range via mass weight. The method further includes providing final tilt correction through magnetic attraction between magnets and a magnetically attractive material which overcomes the predetermined material stiffness of the pendulum suspension element to position the platform in a substantially plumb and level state.

In another embodiment, provided is a self-leveling method which compensates for material stiffness in a pendulum suspension system of a laser alignment tool providing a laser beam. The method comprises providing a platform, and supporting the platform from a pendulum suspension element having a predetermined material stiffness. The platform has a large self-leveling range via mass weight. The method further includes providing a magnetically attractive material to the pendulum suspension system, surrounding the magnetically attractive material with magnets such that as the platform is tilted as a result of the housing being tilted, an attractive force between the material and a magnet in the direction of the tilt increases, thereby compensating for the material stiffness of the pendulum suspension element and pulling the platform in an orientation that is substantially truly level and plumb.

In still another embodiment, provided is a self-leveling laser alignment tool which provides a laser beam in a substantially truly level or plumb orientation. The apparatus comprises a housing, and a pendulum suspension system having a pendulum platform secured to the housing and depending internally in the housing via a pendulum suspension element for effecting a first stage of alignment when the housing is not truly level or plumb, leaving a residual angle of deviation of the laser beam from a truly level or plumb orientation. The apparatus further includes a magnetically attractive material provided to the pendulum suspension system, and magnets mounted to the housing and surrounding the material such that as the platform is tilted as a result of the housing being tilted, an attractive force between the material and a magnet in the direction of the tilt increases, thereby effecting a second stage of alignment by compensating for material stiffness of the pendulum support and pulling the platform in an orientation that is substantially truly level and plumb.

These and other features and advantages of the invention will be more fully understood from the following description of the various embodiments of the invention taken together with the accompanying drawing. It is noted that the scope of the claims is defined by the recitations therein, and not by the specific discussion of features and advantages set forth in the present description.

BRIEF DESCRIPTION OF THE DRAWINGS

The organization and manner of operation of the invention, together with further objects and advantages thereof, may best be understood by reference to the following description taken in connection with the accompanying drawing in which.

DETAILED DESCRIPTION OF THE VARIOUS EMBODIMENTS

Figure 1:
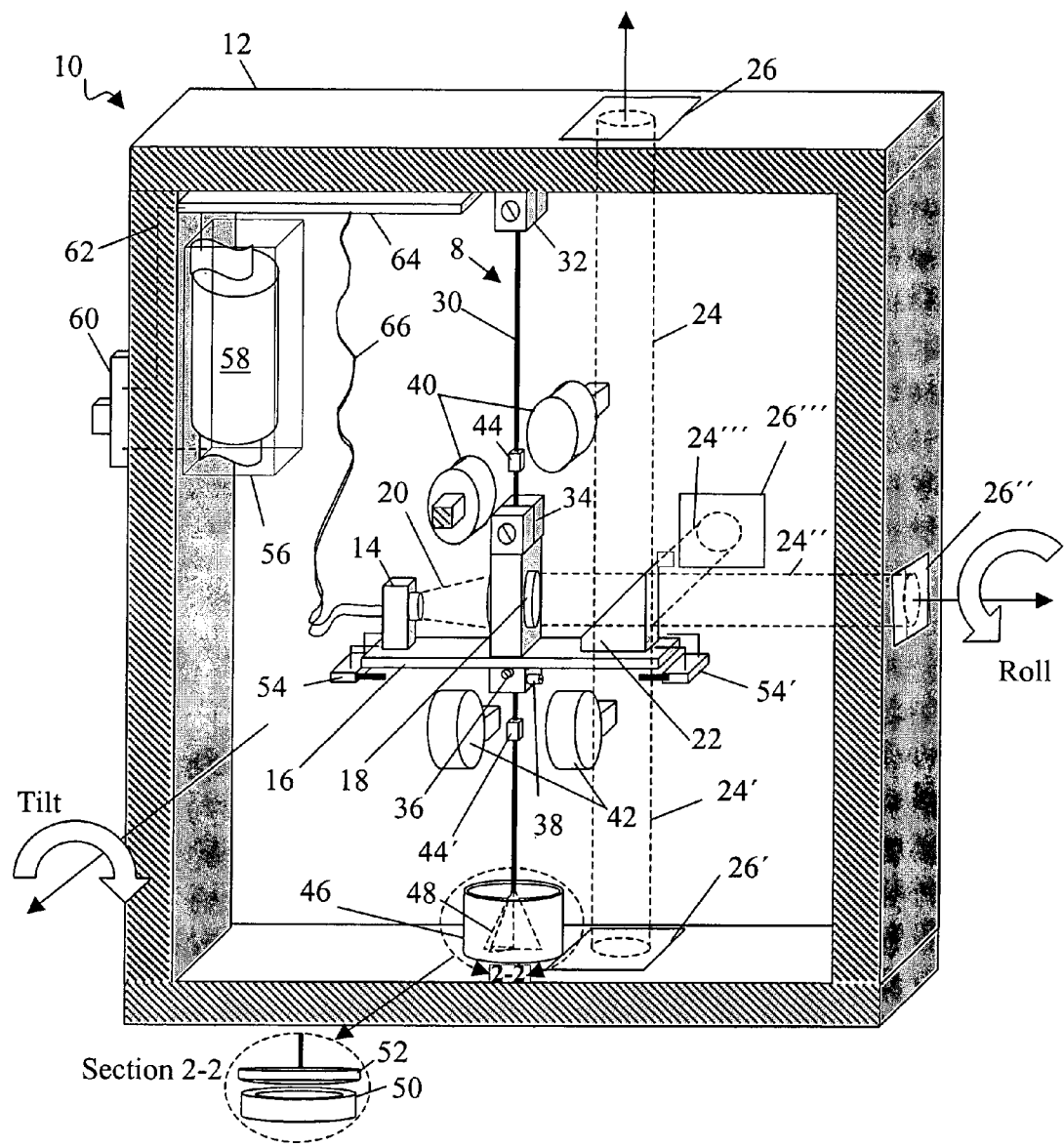
FIG. 1 is a partial section view of a pendulous laser projector hanging by a single support according to one embodiment of the present invention.

While the invention may be susceptible to embodiment in different forms, there is shown in the drawing, and herein will be described in detail, specific embodiments with the understanding that the present disclosure is to be considered an exemplification of the principles of the invention, and is not intended to limit the invention to that as illustrated and described herein.

Skilled artisans appreciate that elements in the drawing are illustrated for simplicity and clarity and have not necessarily been drawn to scale. For example, the dimensions of some of the elements in the drawing may be exaggerated relative to other elements to help to improve understanding of the various embodiments of the present invention.

FIG. 1 shows generally one illustrative embodiment of a self-leveling laser alignment tool 10 having a housing 12. The housing 12 is partially cut-away removing a sidewall to show an internally housed pendulum suspension system, generally indicated as symbol 8, of the tool 10. As depicted, a visible laser source 14 is mounted on a pendulum platform 16 of the pendulum suspension system 8. The diverging laser beam generated by the laser source 14 working in conjunction with lens 18 provides a convergent focus at a predetermined distance.

In the illustrated embodiment, the emerging light beam 20 is partially reflected by an optic 22 splitting the beam into upwardly and downwardly directed beam 24, 24' and a pair of orthogonal horizontal beams 24" and 24'". It is to be appreciated in other embodiments, that beam splitter 22 may also be of the type which produces three orthogonal horizontal beams and two vertical beams (one up and one down), such as the type disclosed by U.S. Pat. No. 6,563,646 to Litvin, commonly own by Trimble Navigation Limited (Sunnyvale, Calif.), of which the disclosure is incorporated fully by reference.

In still other embodiments, the emerging beam 20 may be reflected from a surface to cause a desired beam orientation with or without an included beam splitter. Exit windows 26, 26', 26" and 26'" are provided for the level, plumb, and square beams. It is to be appreciated that weak lenses, typically used in prior art device for final tilt compensation, are not needed due to the compensation method of the present invention.

The pendulum platform 16 hangs by a pendulum suspension element 30, such as a single wire, coil spring(s) or any other element that flexes and has sufficient torsional stiffness, whose material stiffness (i.e., bending, strain, deflection) is such that it allows the pendulum platform to hang very nearly plumb when the tool 10 is tilted. In one example, the pendulum platform 16 weighs approximately 25 grams, and the pendulum suspension element 30 is a 18 mm long, 0.18 mm diameter wire. Such an arrangement is sufficiently weak to allow the pendulum platform 16 to hang under the force of gravity to approximately 98% of true plumb within a housing tilt range of ±5°.

The pendulum suspension element 30 is fastened at the top to the housing 12 by clamp 32 and at the bottom to the pendulum platform 16 by clamp 34. Adjustment screws 36 and 38 are provided to calibrate the pendulum platform 16, and hence laser beams, to a level and plumb orientation. As known, turning the screws 36 and 38 finely adjusts the location of the center of gravity, thus redirecting the laser beams. There are other well known methods of shifting the location of the center of gravity, such as selectively adding or subtracting weight.

Final tilt compensation of the pendulum platform 16 is provided by magnet pairs 40 and 42, which correct for the slight lack of plumb and level caused by the material stiffness of the pendulum suspension element 30. In one embodiment, this final tilt compensation is sufficient to correct approximately 2% error due to the material stiffness of a wire pendulum suspension element 30. When the tool 10 is tilted, magnets 40 and 42 compensate for the material stiffness of the pendulum suspension element 30 by pulling the pendulum platform 16 to a fully substantially plumb or level orientation. The final orientation of the platform 16 by this method is accurate to within about ±30 arcseconds of truly plumb or level.

Magnetically attractive materials, such as ferrous members 44 and 44', are used to pull the pendulum platform 16 into the substantially truly plumb or level orientation. As depicted, the ferrous members 44 and 44' are aligned between their respective magnet pairs 40 and 42. The magnetic pairs 40 and 42 are provided along a respective axis, thereby providing two orthogonal horizontal axis, for example, an X axis and a Y axis.

In the present invention, the same poles of each magnetic pair 40 and 42 are oriented opposite of each other to provide a laterally regionally linear force due to a magnetic field. Accordingly, as the housing 12 is tilted, a pair of attractive forces, one increasing and one decreasing acting upon the magnetically attractive materials 44 and 44' as a result from magnet pairs 40 and 42 provides a resultant force in the direction of tilt on the pendulum platform, thereby effecting a final or second stage of alignment by compensating for material stiffness of the pendulum suspension element 30 and pulling the platform 16 in an orientation that is substantially truly level and plumb.

In an experimental embodiment, values disclosing final tilt compensation by the present invention are disclosed by Table 1 and Table 2. For the experimental embodiment used to compile the data of Table 1 and Table 2, the suspension element was a support wire comprised of a 0.735 inch (18.67 mm) length of music wire supporting a pendulum platform and a pair of ferrous members. The pendulum platform weighed 25.7856 grams, and the pair of ferrous members where located 1.0325 inches (26.23 mm) and 2.44 inches (61.98 mm) from a clamp fixedly holding the support wire. Each ferrous member was situated in a magnetic field provided by a respective pair of magnets. The two pairs of magnets were situated to provide two orthogonal magnetic fields to compensate for tilt along a Tilt Axis and an Roll axis (see FIG. 1). A pool of oil was provided to influence a portion of the pendulum platform and dampen any pendulous oscillation.

TABLE 1

| Tilt of Housing (minutes) | Error of Pendulum Platform in Tilt Direction (arcseconds) |
| --- | --- |
| 0 | 0 |
| 30 | −3 |
| 60 | −1 |

TABLE 2

| Roll of Housing (minutes) | Error of Pendulum Platform in Tilt Direction (arcseconds) |
|---|---|
| 0 | 0 |
| 30 | −1 |
| 60 | −3 |

As illustrated by Table 1, orientation of the pendulum platform relative to plum remains nearly constant while the tilt angle of the housing varies. This error correction method of the present invention is dependent on the length of the suspension element or support wire 30, the diameter of the support wire, the modulus of elasticity of the support wire, the center of gravity of the pendulum platform, mass of the pendulum suspension system 8, the strength of attraction between the magnetic pairs 40 and 42 and their respective magnetically attractive members 44 and 44'. Additionally, it is to be appreciated that a change in the geometric shape of the suspension element will also change its material stiffness as the area moment of inertia (I) is geometry dependent. In particular, the parameters and their selection for a particular range of final error correction for a spring suspension element can be determined with the following differential equations:

$$r_f \cdot \beta = \frac{\partial U}{\partial Q_y} = K_1 + K_2 + K_3 + K_4 + K_5 + K_6, \text{ where:}$$

$$K_1 = \frac{1}{EI}\int_{A_1}^{B_1} M_{s1}\frac{\partial M_{s1}}{\partial Q_y} \cdot \frac{r}{\cos(\psi)} d\theta +$$

$$\frac{1}{EI}\int_{A_2}^{B_2} M_{sM}\frac{\partial M_{sM}}{\partial Q_y} \cdot \frac{r_0}{\cos(\psi_0)} d\theta + \frac{1}{EI}\int_{A_3}^{B_3} M_{s2}\frac{\partial M_{s2}}{\partial Q_y} \cdot \frac{r}{\cos(\psi)} d\theta$$

$$K_2 = \frac{1}{EI}\int_{A_1}^{B_1} M_{n1}\frac{\partial M_{n1}}{\partial Q_y} \cdot \frac{r}{\cos(\psi)} d\theta + \frac{1}{EI}\int_{A_2}^{B_2} M_{nM}\frac{\partial M_{nM}}{\partial Q_y} \cdot \frac{r_0}{\cos(\psi_0)} d\theta +$$

$$\frac{1}{EI}\int_{A_3}^{B_3} M_{n2}\frac{\partial M_{n2}}{\partial Q_y} \cdot \frac{r}{\cos(\psi)} d\theta$$

$$K_3 = \frac{1}{GJ}\int_{A_1}^{B_1} M_{t1}\frac{\partial M_{t1}}{\partial Q_y} \cdot \frac{r}{\cos(\psi)} d\theta + \frac{1}{GJ}\int_{A_2}^{B_2} M_{tM}\frac{\partial M_{tM}}{\partial Q_y} \cdot \frac{r_0}{\cos(\psi_0)} d\theta +$$

$$\frac{1}{GJ}\int_{A_3}^{B_3} M_{t2}\frac{\partial M_{t2}}{\partial Q_y} \cdot \frac{r}{\cos(\psi)} d\theta$$

$$K_4 = \frac{1}{EA}\int_{A_1}^{B_1} F_{t1}\frac{\partial F_{t1}}{\partial Q_y} \cdot \frac{r}{\cos(\psi)} d\theta + \frac{1}{EA}\int_{A_2}^{B_2} F_{tM}\frac{\partial F_{tM}}{\partial Q_y} \cdot \frac{r_0}{\cos(\psi_0)} d\theta +$$

$$\frac{1}{EA}\int_{A_3}^{B_3} F_{t2}\frac{\partial F_{t2}}{\partial Q_y} \cdot \frac{r}{\cos(\psi)} d\theta$$

$$K_5 = \frac{1}{GA}\int_{A_1}^{B_1} F_{n1}\frac{\partial F_{n1}}{\partial Q_y} \cdot \frac{r}{\cos(\psi)} d\theta + \frac{1}{GA}\int_{A_2}^{B_2} F_{nM}\frac{\partial F_{nM}}{\partial Q_y} \cdot \frac{r_0}{\cos(\psi_0)} d\theta +$$

-continued $$\frac{1}{GA}\int_{A_3}^{B_3} F_{n2}\frac{\partial F_{n2}}{\partial Q_y} \cdot \frac{r}{\cos(\psi)} d\theta$$

$$K_6 = \frac{1}{GA}\int_{A_1}^{B_1} F_{n1}\frac{\partial F_{n1}}{\partial Q_y} \cdot \frac{r}{\cos(\psi)} d\theta + \frac{1}{GA}\int_{A_2}^{B_2} F_{nM}\frac{\partial F_{nM}}{\partial Q_y} \cdot \frac{r_0}{\cos(\psi_0)} d\theta +$$

$$\frac{1}{GA}\int_{A_3}^{B_3} F_{n2}\frac{\partial F_{n2}}{\partial Q_y} \cdot \frac{r}{\cos(\psi)} d\theta$$

and where $r_f$ was the radius of curvature for the arc that $Q_y$ travels through. $Q_y$ is the lateral force on the end of the suspension element due to the mass of the pendulum platform when the housing is tilted. U is the strain energy associated the system. The variables n, s, and t represent a local coordinate system associated with the spring geometry. $M_i$ and $F_i$ represents the moments and forces applied to the spring in the local coordinate system. The variables r, and ψ represent the geometry of the spring.

As illustrated by Table 2, orientation of the pendulum platform relative to plum remains nearly constant while the roll angle of the housing varies. This holds true as long as the ferrous material remains in the region of the magnetic field where the force created by the magnet pair that is latterly linear.

To dampen the oscillation of the pendulum suspension system 8, in one embodiment a damping pool 46 is provided within the housing below the pendulum platform 16. The damping pool 46 contains a viscous fluid, such as mineral oil, which interacts with a fin 48 suspended from the pendulum platform 16. In another embodiment illustrated by the cut-away of section 2—2, eddy current braking may be used to also dampen the pendulous oscillation of the pendulum platform 16 as known in the art. Magnet(s) 50 may be positioned close to a damping member 52 supported from the pendulous pendulum platform for this purpose.

Mechanical stops 54 and 54' are provided to limit the motion of the pendulum suspension system 8 and to protect the support wire 30 and clamps 32 and 34 from damage due to mechanical shocks, while allowing a range of tilt compensation, such as for example ±5° in each direction. Stops 54 and 54' are positioned close to the center of gravity of the pendulum platform 16 to minimize shock induced rotation. Stops 54 and 54' also restrain up/down motion of the pendulum suspension system 8 to prevent damage to the suspension element 30 from unwanted upward and downward motion of the pendulum platform 16.

A battery compartment 56 holds a battery 58 in place in the housing 12 by a spring at the rear and a spring at the front. A switch 60 controls the flow of current to a lead 62 supplying power to a circuit board 64. The components of the circuit board 64 have been omitted to reduce the complexity of the drawing. The circuit board 64 is mounted to the housing 12 and drives the laser source 14, such as a diode, using electrical leads 66. The suspension element 30 may be used as one of these leads, connected to the circuit board by a lead. The electrical leads 66 are fine copper or gold wires which convey power to the laser source 14. The diameter of the electrical leads 66 is less than 25 microns to avoid any mechanical forces which might influence the pendulum suspension system 8. In addition, the length of the electrical leads 66 is relatively long to reduce the effect of any mechanical forces which do exist.

Although the circuit board 64 has been depicted as being mounted to the housing, in other embodiments, the circuit board 64 may be mounted to the pendulum platform 16. Additionally, in other embodiments it is also to be appreciated that either the laser source 14 or the optical elements 18 and 20 (together or separately) may be hung from the pendulum platform 16, with the remaining optical parts mounted to the housing 12.

The above described embodiments are intended to illustrate the principles of the invention, not to limit its scope. Other embodiments in variations to these preferred embodiments will be apparent to those skilled in the art and may be made without departing from the spirit and scope of the invention as defined in the following claims.

What is claimed is:

1. A self-leveling method which compensates for material stiffness in a pendulum suspension system of a laser alignment tool, said method comprising:

supporting a platform from a pendulum suspension element having a predetermined material stiffness, said platform having a large self-leveling range via mass weight;

providing final tilt correction through magnetic attraction between magnets and a magnetically attractive material provided to the pendulum suspension system which overcomes said predetermined material stiffness of the pendulum suspension element to position said platform in a substantially plumb state.

2. The method of claim 1 wherein said magnets provide a regionally linear force due to a magnetic field around said material.

3. The method of claim 1 wherein said magnetically attractive material is mounted to said pendulum suspension element.

4. The method of claim 1 wherein said pendulum suspension element is a material selected from the group consisting of wires, springs, and combinations thereof.

5. The method of claim 1 wherein said magnets are two pairs of magnets situated along the pendulum suspension system and providing two regionally linear forces due to magnetic fields that each attract respective ones of the magnetically attractive material.

6. The method of claim 1 further comprising supporting a laser source with said platform.

7. The method of claim 1 further comprising supporting optics with said platform.

8. The method of claim 1 further comprising supporting at least one reflective surface with said platform.

9. The method of claim 1 further comprising damping pendulum oscillation of said platform.

10. The method of claim 1 wherein said self-leveling range is to about 98% of true plumb for a tilt range from a true horizon of about ±5°.

11. The method of claim 1 wherein said final tilt correction is to correct a plumb error up to about 2% from true plumb.

12. A self-leveling method which compensates for material stiffness in a pendulum suspension system of a laser alignment tool providing a laser beam, said method comprising:

providing a platform;

supporting said platform from a pendulum suspension element having a predetermined material stiffness, said platform having a large self-leveling range via mass weight;

providing a magnetically attractive material to said pendulum suspension system;

surrounding said magnetically attractive material with magnets such that as said platform is tilted, an attractive force between said material and a magnet pair in the direction of the tilt increases, thereby compensating for said material stiffness of said pendulum suspension element and pulling said platform in an orientation that is substantially truly level or plumb.

13. The method of claim 12 wherein said magnet pair provides a regionally linear force due to a magnetic field around said pendulum suspension element.

14. The method of claim 12 wherein said pendulum suspension element is a material selected from the group consisting of wires, springs, and combinations thereof.

15. The method of claim 12 further comprising supporting a laser source with said platform, said laser source generating the laser beam.

16. The method of claim 12 further comprising supporting optics with said platform in the path of the laser beam.

17. The method of claim 12 further comprising supporting at least one reflective surface with said platform.

18. The method of claim 12 wherein said magnets are two pairs of magnets situated along the pendulum suspension system and providing two orthogonal magnetic fields.

19. The method of claim 12 further comprising damping pendulum oscillation of said platform.

20. The method of claim 12 wherein said self-leveling range is to about 98% of true plumb for a tilt range from a true horizon of about ±5°.

21. The method of claim 12 wherein said final tilt correction is to correct a plumb error up to about 2% from true plumb.

22. A self-leveling laser alignment tool which provides a laser beam in a substantially truly level or plumb orientation, said apparatus comprising:

a housing;

a pendulum suspension system having a pendulum platform secured to the housing and depending internally in the housing via a pendulum suspension element for effecting a first stage of alignment when the housing is not truly level or plumb, leaving a residual angle of deviation of the laser beam from a truly level or plumb orientation;

a magnetically attractive material provided to said pendulum suspension system; and magnets mounted to said housing and surrounding said material such that as said platform is tilted, an attractive force between said material and a magnet pair in the direction of the tilt increases, thereby effecting a second stage of alignment by compensating for material stiffness of said pendulum suspension element and pulling said platform in an orientation that is substantially truly level or plumb.

23. The apparatus of claim 22 wherein said magnets provide a regionally linear force due to a magnetic field around said pendulum suspension system.

24. The apparatus of claim 22 wherein said pendulum suspension element is a material selected from the group consisting of wires, springs, and combinations thereof.

25. The apparatus of claim 22 wherein said platform includes a laser source which generates the laser beam.

26. The apparatus of claim 22 wherein said platform includes optics in the path of the laser beam.

27. The apparatus of claim 22 wherein said platform includes at least one reflective surface situated in the path of the laser beam.

28. The apparatus of claim 22 wherein said magnets are two pairs of magnets situated along the pendulum suspension system and providing two orthogonal magnetic fields.

29. The apparatus of claim 22 further comprising a damping member influencing said pendulum platform to dampen pendulous oscillation of said platform.

30. The apparatus of claim 22 wherein said self-leveling range is to about 98% of true plumb for a tilt range from a true horizon of about ±5°.

31. The apparatus of claim 22 wherein said final tilt correction is to correct a plumb error up to about 2% from true plumb.

32. The apparatus of claim 22 wherein said material is provided on said pendulum suspension member.

* * * * *